June 12, 1928.  
W. I. CLEMENTS  
1,673,664  
COMBINED GLARE, WIND, RAIN, AND INSECT SHIELD FOR AUTOMOBILES  
Filed Oct. 24, 1925  
3 Sheets-Sheet 3
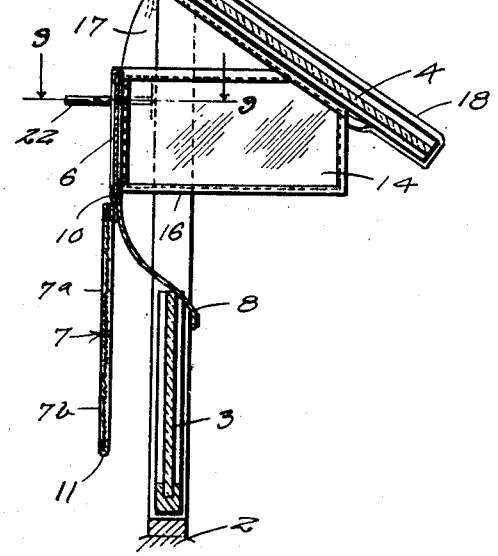
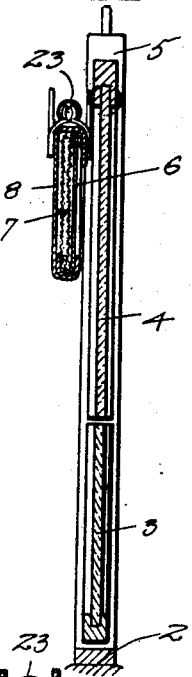
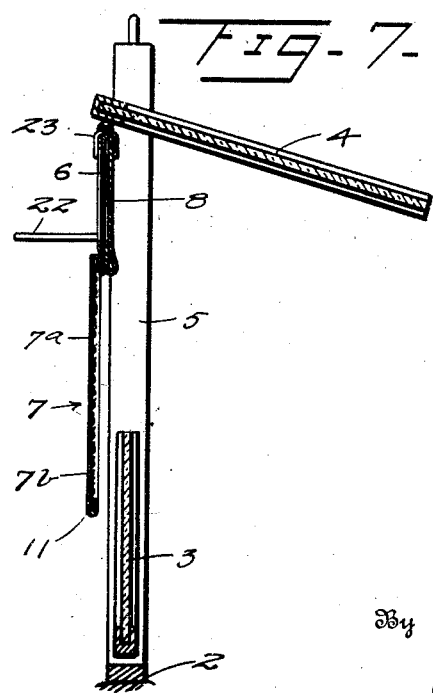
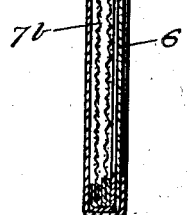
Inventor  
W. I. Clements Patented June 12, 1928.

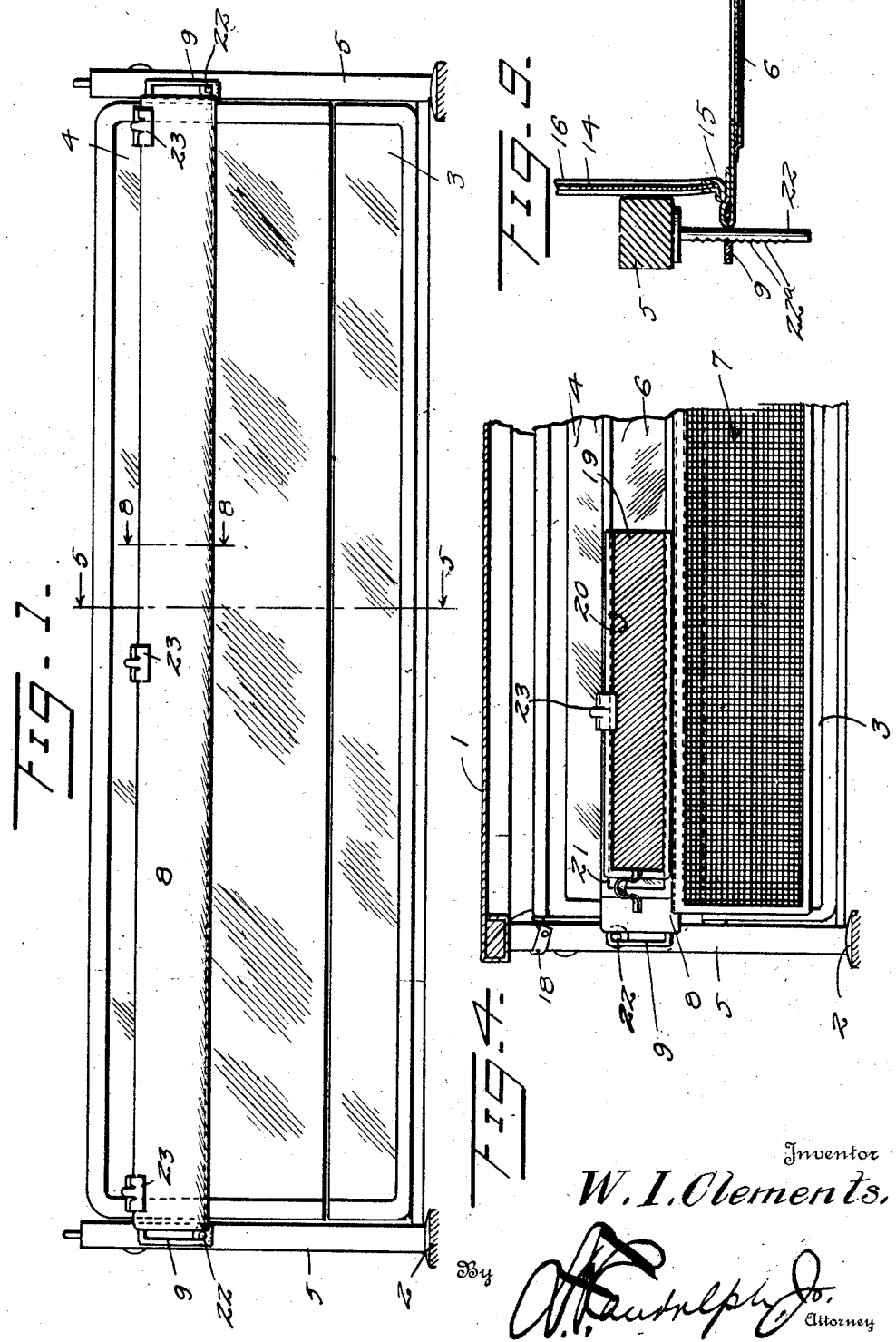

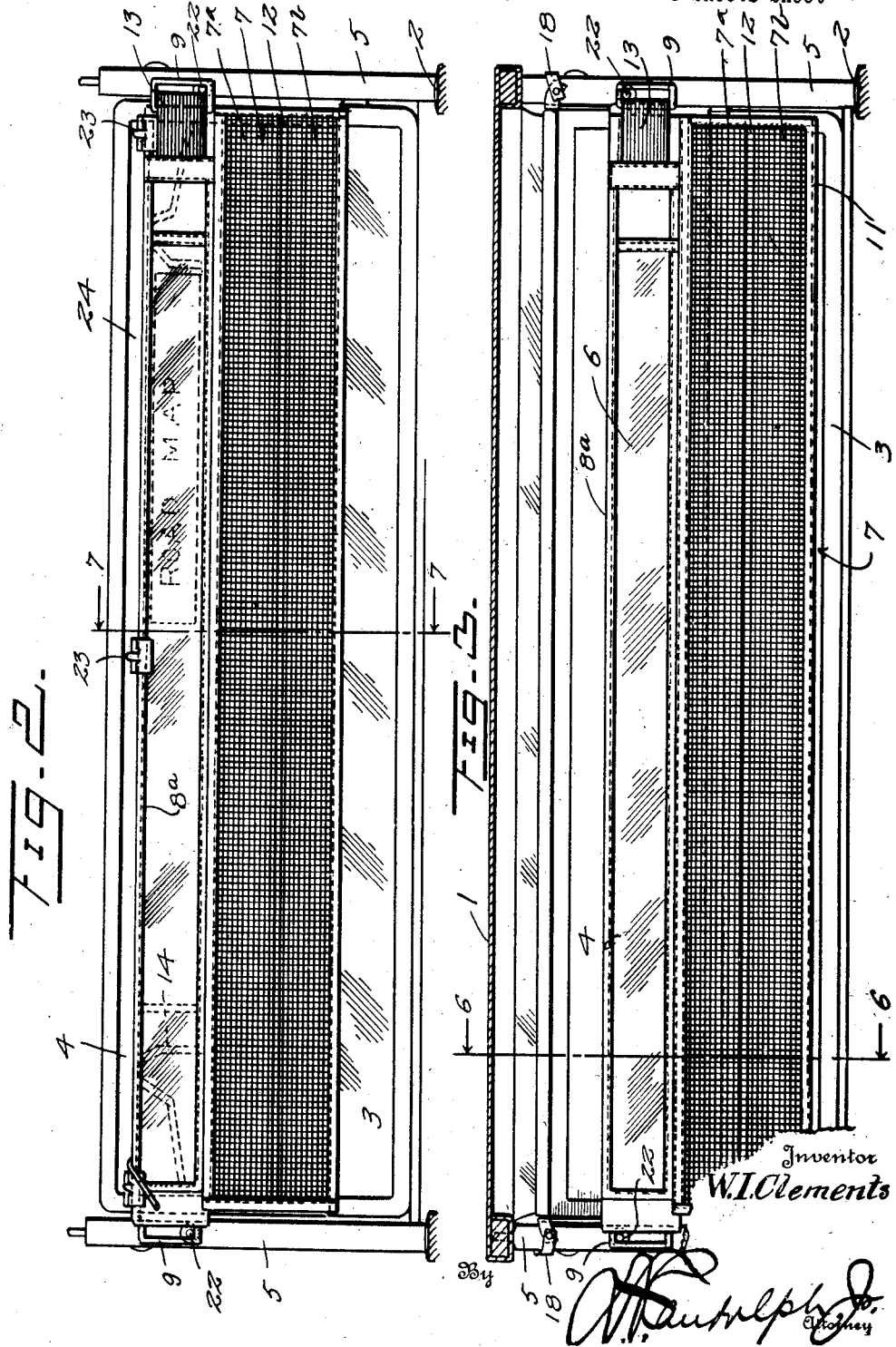

1,673,664

UNITED STATES PATENT OFFICE.

WELLINGTON I. CLEMENTS, OF NORFOLK, VIRGINIA.

COMBINED GLARE, WIND, RAIN, AND INSECT SHIELD FOR AUTOMOBILES.

Application filed October 24, 1925. Serial No. 64,629.

This invention relates to shields for automobiles, and has for one of its objects the provision of a device of this character which, in one of its many adaptations, will present an opaque panel extending horizontally across an automobile in front of the driver and occupying such a position above his line of vision as to protect his eyes from the glare of the road and from blinding light rays emanating from any source or sources located in advance of and in any angular position with respect to the front of the automobile.

A further object of the invention is the provision of an automobile shield which, in the stated adaptation shall be vertically and horizontally adjustable whereby to adapt it for use by drivers of different heights.

A further object of the invention is the provision of an automobile shield which, in another adaptation thereof, will without obstructing his view of the road afford protection for the face and eyes of the driver of an automobile against the wind, insects, and the like while driving with the windshield opened.

A further object of the invention is the provision of an automobile shield which, in a still further adaptation thereof, will afford a clear and unobstructed view of the road while driving in the rain with the windshield opened, whereby to prevent the accumulation of water and moisture on the windshield from interfering with the vision of the driver, and which will prevent the rain from entering the automobile.

A still further object of the invention is the provision of a shield of the character stated which shall provide a receptacle for road maps, cigars, cigarettes, mirrors and the like.

With the foregoing and other objects in view, the nature of which will be readily understood as the description proceeds, the invention consists of the novel construction, combination and arrangement of parts hereinafter fully described and claimed, and illustrated in the accompanying drawings, wherein:

Figure 1 is an elevational view illustrating the shield applied and arranged to protect the eyes of the driver of an automobile from light rays and the glare of the road, Figure 2 is an elevational view illustrating the shield applied and arranged to protect the eyes of the driver from light rays and the glare of the road and his face and eyes from insects and the like when driving with the windshield opened, Figure 3 is an elevational view illustrating the shield applied and arranged to protect the driver and afford him a clear vision of the roadway when driving in the rain with the windshield opened, Figure 4 is an elevational view illustrating the application of a colored glare protector to the shield when it is arranged as shown in Figure 3, Figure 5 is a vertical sectional view taken on the plane indicated by the line 5—5 of Figure 1, Figure 6 is a vertical sectional view taken on the plane indicated by the line 6—6 of Figure 3, Figure 7 is a vertical sectional view taken on the plane indicated by the line 7—7 of Figure 2, Figure 8 is a detail vertical sectional view taken on the plane indicated by the line 8—8 of Figure 1, and Figure 9 is a similar view taken on the horizontal plane indicated by the line 9—9 of Figure 6.

Corresponding and like parts are referred to in the following description, and designated in the several views of the accompanying drawings, by similar reference characters.

In the drawings, 1 designates the top and 2 the cowl of an automobile. 3 designates the lower and 4 the upper section of the windshield of the automobile, and 5 the posts which support the front end of the top 1 and to and between which the windshield sections are pivoted.

The shield comprises a transparent and imperforate panel 6 which is preferably made of celluloid, a transparent and perforated panel 7 which is preferably made of wire cloth, and an imperforate and opaque panel 8 which is made of waterproof material. The panels 6, 7 and 8 are of the same length, the panels 6 and 8 are of the same width and the panel 7 is greater in width than the panels 6 and 8. The panel 6 is secured in a flexible frame or binding 8ª to the end members of which attaching loops 9 are secured and to the bottom member of which an edge of each of the panels 7 and 8 is hinged or flexibly secured as shown at 10. The panel 7 is secured in a flexible frame or binding 11, and is of sectional formation. The sections 7ª and 7ᵇ of this panel are connected together as indicated at 12 to permit them to be folded one against the other or to permit them to be extended. One of the attaching loops 9 is connected directly to the frame or binding 8ª, and the other is connected to the frame or binding by an elastic tab 13. A transparent and imperforate panel 14 is hinged or flexibly connected at one end as at 15 to one end of the frame or binding 8ª. The panel 14 is of less length than the panel 6 and is preferably made of celluloid and secured in a flexible frame or binding 16. A flexible and opaque panel 17, which is preferably made of water-proof material and of triangular contour, is secured to the top member of the frame or binding 16, and is provided with attaching tapes or strings 18. A colored panel 19 which is preferably made of celluloid and secured in a flexible frame or binding 20, is secured by a tab 21 to that end of the frame or binding 8ª to which the panel 14 is secured.

In practice, the shield is adapted to be secured to the posts 5 rearwardly of the windshield by means of the loops 9 and pins 22 fixed to and extending rearwardly and horizontally from said posts. The pins 22 are provided in their outer sides with notches 22ª to receive the loops 9, whereby to prevent the shield from being forced inwardly by the wind. The device is as long as the windshield and occupies a horizontal position across the upper portion thereof. The loops 9 and pins 22 support the device for vertical and horizontal adjustment, and the elastic tab 13 holds the panel 6 taut and retains the loops 9 in the notches 22ª against casual retraction.

The device is, as shown in Figures 1 and 5, adapted to be used to protect the eyes of the driver from the glare of the road and from blinding light rays emanating from any source or sources located in advance of and in any angular position with respect to the front of the automobile. When the device is used for this purpose, the sections 7ª and 7ᵇ of the panel 7 are folded one against the other and against the panel 6, and the panel 8 is folded against the folded panel sections 7ª and 7ᵇ. The panels 14, 17 and 19 are positioned between the folded panel 8 and the folded panel sections 7ª and 7ᵇ. The device is retained in this condition by spring clips 23. The device now presents an opaque shield which extends horizontally across the windshield of the automobile and which may be adjusted horizontally toward and away from the driver and vertically to such a position with respect to his eyes so that it will protect them from the glare of the road or from blinding rays of the sun, automobile headlights, street lamps and the like. The driver views the road from a plane below the lower edge of the shield.

The device is, as shown in Figures 2 and 7, also adapted to be used to protect the eyes of the driver and his face when driving with the windshield open during dry weather, and when the device is to be used for this purpose the panels 8, 14 and 17 are secured by the clips 23 against the panel 6 and the panel 7 is arranged in an unfolded and dependent position with respect to the panel 6. The device now presents an opaque and imperforate upper panel and a transparent and perforated lower panel. The upper panel protects the eyes of the driver from blinding light rays and the wind, and the lower panel protects the driver from insects and the like and also breaks the force of the air passing therethrough. The device may also be adjusted vertically or horizontally as conditions require, and the road may be clearly seen through the panel 7.

When the device is adapted for either of the purposes stated, the folded panels thereof provide a pocket for the reception of a road map 24, cigarettes, cigars and like articles. A mirror, which is not shown, may also be placed in this pocket in order that the road in rear of the automobile may be seen, and when used can be seen through the panel 6.

The device is, as shown in Figures 3, 4 and 6 also adapted to be used to afford a clear and unobstructed view of the road while driving in the rain and to protect the driver from the rain and his eyes from the blinding rays of headlights and street lamps. When the device is used for this purpose, the upper windshield section 4 is raised so that the water accumulating thereon cannot obstruct the view of the driver, and the panels 7 and 8 are arranged in a dependent position with respect to the panel 6 and the panel 8 extended over the upper edge of the lower windshield section 3. The panels 14 and 17 are arranged in a forwardly directed position with respect to the panel 6, and are retained in this position by the tapes or strings 18 which are secured about the open upper windshield section 4. Due to the relative arrangement of the panels 6, 8, 14 and 17, and their arrangement with respect to the opened windshield section 4, together with the arrangement of the panel 8 with respect to the closed lower windshield section 3, no rain can enter the automobile. The panels 14 and 17 and the raised upper windshield section 4 protects the panel 6 from water, and due thereto it will be apparent that the road can be clearly seen through the panel 6. Any moisture condensing on the panel 6 may be readily wiped therefrom by the finger. At night the colored panel 19 is secured to the panel 6 by one of the clips 23 in the manner illustrated in Figure 4.

From the foregoing description, taken in connection with the accompanying drawings, the advantages of the construction and of the uses to which the device may be put will be readily apparent to those skilled in the art to which it appertains. While I have described the principle of the invention, together with the device which I now consider to be the best embodiment thereof, I desire to have it understood that the device shown is merely illustrative, and that such changes may be made when desired as are within the scope of the invention as claimed.

What is claimed is:—

1. A shield for an automobile comprising an upper imperforate and transparent panel, a lower perforated and transparent panel, a second lower imperforate and opaque panel arranged in advance of said first lower panel and of less width than the same, and means adapted to support the panels in advance of the driver's seat to protect the driver from dust, insects and rain when the windshield is opened and from road glare when the windshield is closed and opened.

2. A shield for an automobile comprising a transparent panel, an opaque panel connected to the lower edge of said first panel and adapted to occupy folded and depending positions with respect thereto, a perforated panel connected to the lower edge of said first panel and adapted to occupy folded and depending positions with respect thereto, and means releasably securing the opaque and perforated panels in their folded positions.

3. A shield for an automobile comprising a transparent panel, a transparent and perforated panel connected to the lower edge of said first panel, an opaque panel connected to the lower edge of said first panel, and a transparent panel connected to an end of said first panel, said second and third panels being adapted to occupy folded and depending positions with respect to the first panel and said fourth panel being adapted to occupy a folded and forwardly extending position with respect to said first panel, and means releasably securing the second, third and fourth panels in folded position.

4. A shield for an automobile comprising, in combination with the front posts of the automobile, pins secured to and extending rearwardly from the posts, a panel, a vertically elongated loop secured to an end of the panel, and embracing one of the pins, a second similar loop embracing the other pin, and an elastic member securing the second loop to the other end of the panel.

In testimony whereof I affix my signature.

WELLINGTON I. CLEMENTS.